Aug. 16, 1932.  F. W. WARDWELL  1,872,535
SAW MAKING MACHINERY
Filed Jan. 19, 1928  4 Sheets-Sheet 1

Inventor
F. W. WARDWELL
By Fisher, Moser & Moore
Attorney

Aug. 16, 1932.  F. W. WARDWELL  1,872,535
SAW MAKING MACHINERY
Filed Jan. 19, 1928  4 Sheets-Sheet 2
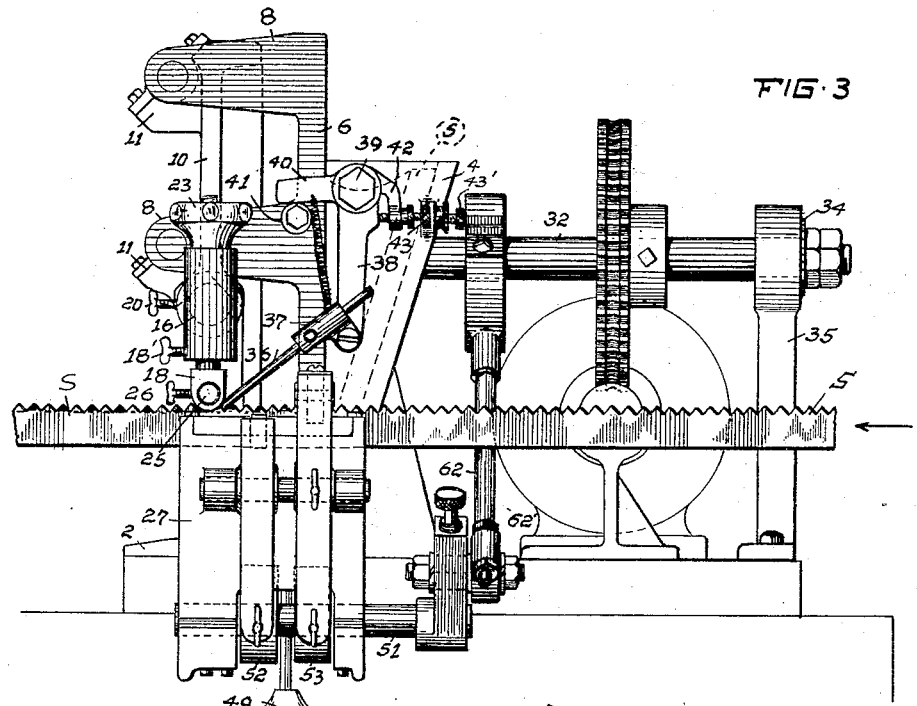
Inventor
F. W. WARDWELL
By Fisher, Moser & Moore, Attorney

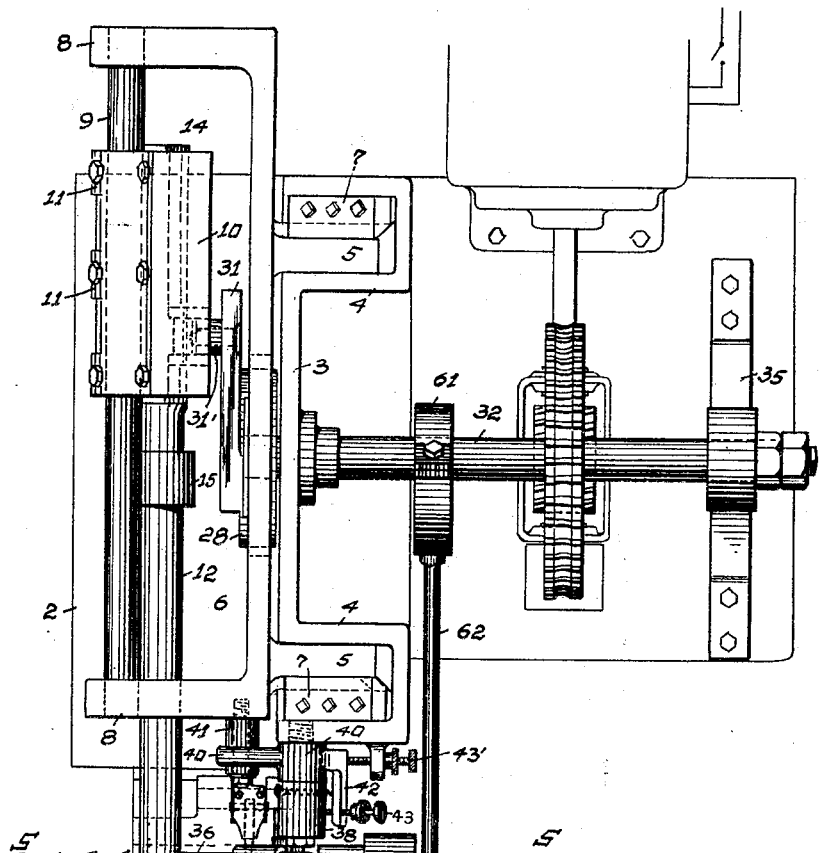

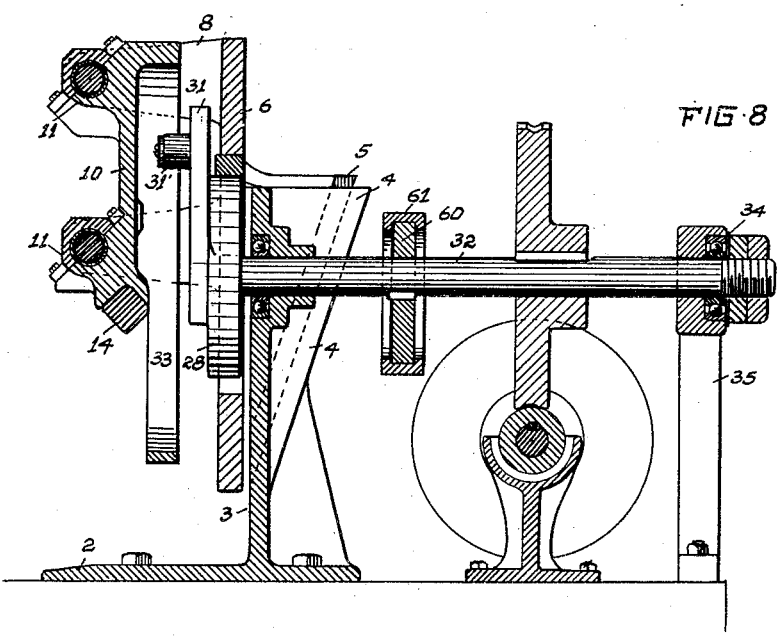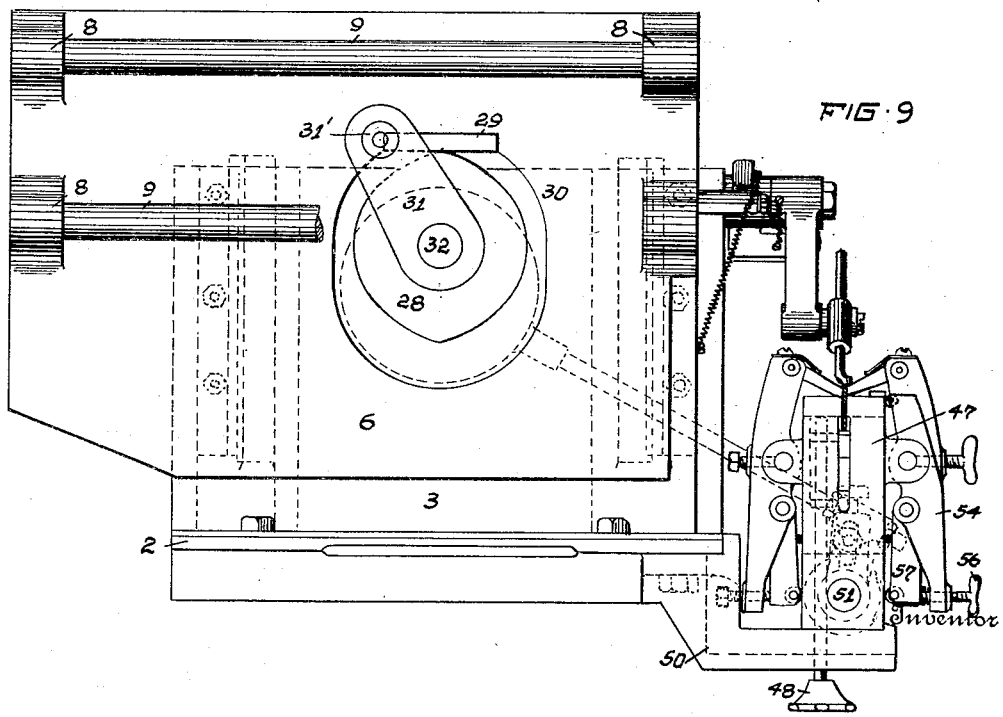

Patented Aug. 16, 1932

1,872,535

UNITED STATES PATENT OFFICE

FRANK WELLINGTON WARDWELL, OF CLEVELAND, OHIO, ASSIGNOR TO THE WARD-WELL MANUFACTURING COMPANY, OF CLEVELAND, OHIO, A CORPORATION OF OHIO

SAW MAKING MACHINERY

Application filed January 19, 1928. Serial No. 247,839.

My invention pertains to saw making machinery, especially saw filing and setting machines, and the present machine is particularly constructed and arranged to set and file the teeth of band saws, although not limited in use to that specific type of saw. In general my object is to provide a speedy operating machine which will set two teeth accurately in opposite directions at the same time and reciprocate a double end file across the set teeth successively in the direction of their slant or set. All the teeth on the saw are set in pairs successively by a pair of co-acting setting devices and then filed singly and consecutively by a tapered double end file, which is raised and lowered obliquely in respect to the cutting face of the tooth while the file is being reciprocated. The first tooth in each pair of set teeth is sharpened by passing one tapered end of the file in one direction over the tooth, and then raising the file during the last half of this stroke, thereby bringing the opposite tapered end of the file into position to file the second tooth in an opposite direction. That result is accomplished by lowering the file at the beginning of the return stroke and utilizing one end part of the file during a part of the return stroke to sharpen the second tooth, the saw having been fed or shifted in respect to the file the distance of one tooth during that interval in the stroke when the file is raised or separated from the saw. As two consecutive teeth are set in opposite directions simultaneously and then filed singly and successively the saw must be fed forward twice before the setting operation is repeated. The saw must also be gripped and held rigidly in a vise during such setting and filing operations to effect accurate setting and filing of the teeth, and when the saw is to be fed onward it must be first released. Accordingly, the machine is designed to effect timed co-operation between all its working parts so that both setting and filing operations and the feeding movements of the saw may proceed automatically without interruption, delay or malfunction the full length of the saw, which if a band saw may be endless.

Figure 1:
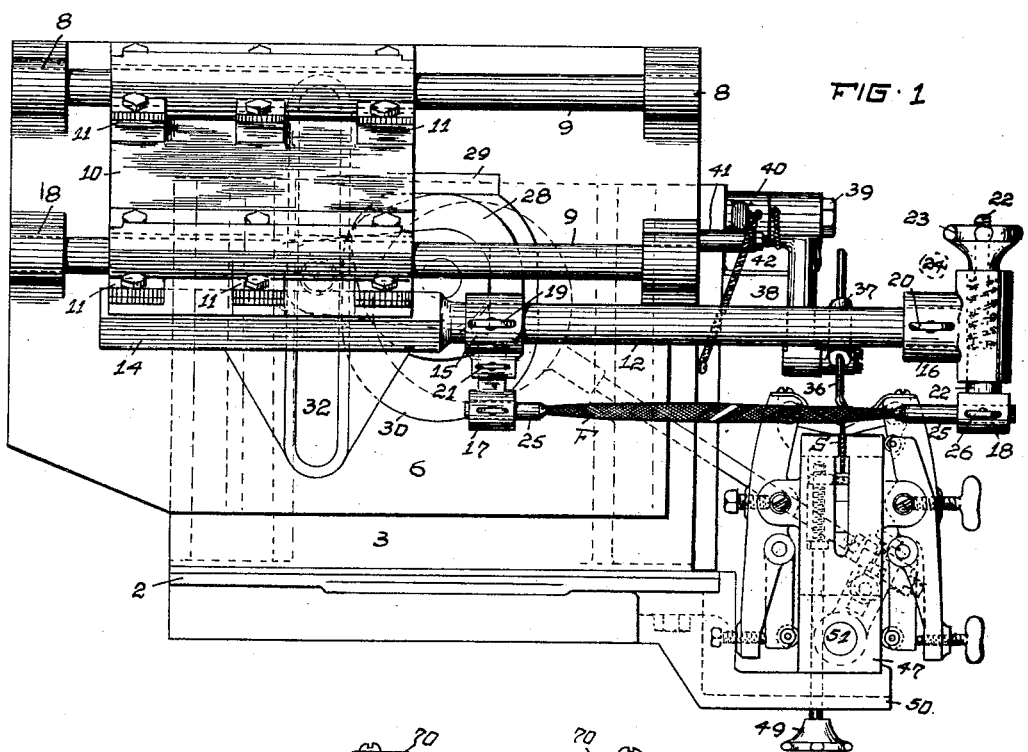
Figure 2:
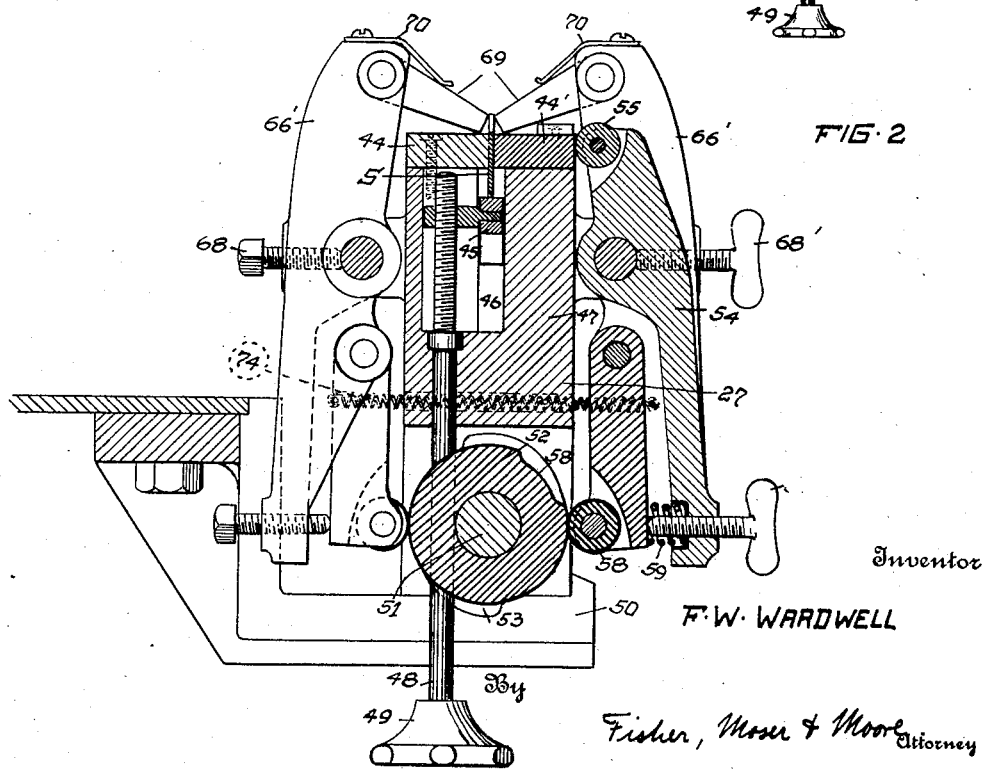

In the accompanying drawings, Fig. 1 is a side view of the machine, and Fig. 2 is an enlarged sectional view of the saw vise. Fig. 3 is a front view of the machine, and Fig. 4 an enlarged sectional view of the saw vise and the setting devices. Fig. 5 is a top view of the machine, and Fig. 6 an enlarged sectional view of the adjustable connecting means for the oscillating shaft which controls the clamping vise and the saw setting devices. Fix. 7 is a diagrammatic view, illustrating the setting and filing steps which take place concurrently in operating the machine. Fig. 8 is a vertical section of the machine on the line of the power shaft. Fig. 9 is a front elevation with the horizontal slide and file holders omitted to show the twin cam which raises the vertical slide.

The machine comprises a main frame or base 2 having an upright wall 3 in which two offset vertically-inclined channels or guide ways 4—4 are provided to seat a pair of inclined ribs 5—5 which are integral with or fixed parts of a vertical frame or slide 6. Steel gibs 7 having beveled faces are secured adjustably within the guide-ways 5 to hold the vertical slide 6 in working position, and when this slide is raised and lowered it is offset and moves in a vertically inclined plane to shift a file F correspondingly in respect to the teeth of a saw S so that a tooth, whether plain, mill, ripsaw, or other form, may be engaged and disengaged from one side. This vertical movement in an inclined plane permits the creation or filing of a hook to the face of the tooth. This hook or tooth can be varied by turning the face of the file F its holders, or by swinging both holders to one side of their supporting arm, but all depends and is dependent upon the vertical offset raising movement of the file. Vertical slide 6 is formed with lateral projections 8 which support a pair of parallel rods 9—9 horizontally of the machine, and a horizontal slide 10 is removably secured in capped boxes or bearings 11 upon these rods. A separate horizontal shaft or arm 12 having a square end portion 14 is bolted or clamped to the bottom of horizontal slide 10, and the round extension part of this arm supports a collar 15 and an end fitting 16 from which a pair of file holders 17 and 18 are suspended. Collar 15 may be adjusted longitudinally of the arm, and both collar and fitting may be rotated on the arm, while a pair of thumb screws 19 and 20 serve to fix the collar and fitting rigidly in the desired adjusted positions. Holder 17 is adjustable vertically in collar 15, and a set screw 21 locks these parts together. Holder 18 is adjustably supported within fitting 16 by a screw-stem 22 and a thumb nut 23, a coiled spring 24 being also provided within the fitting to facilitate adjustment vertically of the holder 18 and file F, but the spring may be omitted as a set screw 18' is used to lock holder 18 against vertical movement during filing operations. The opposite ends of file F are socketed within separate cylindrical members 25 secured adjustably (for longitudinal and rotatable movement) in holders 17 and 18, respectively, by set screws 26. When the file is rigidly held and horizontal slide 10 is reciprocated the file passes back and forth over a vise frame 27 and across a saw S clamped therein. In one stroke or movement of the horizontal slide the point end of the file is lowered obliquely or in an inclined plane into engagement with a tooth on the saw and the tooth is filed in the direction of its set. As the division point on the middle of the double end file is approached the file is lifted apart from the tooth and the other end of the file is not used during the latter part of this stroke. Then as the return stroke begins the file is again lowered on a sloping line relatively to the cutting edge of the tooth and a second tooth is engaged and cut from the opposite point of the file towards the middle, the saw having been fed onward the distance of one tooth during the interval of uplift of the file. The second tooth is thus sharpened during the first half of the return stroke of the file, which is also in the direction of the set of that particular tooth inasmuch as this set is the opposite or reverse of the set of the first tooth. At the end of the return stroke the file is again lifted apart from the saw to permit the saw to be fed forward the distance of another tooth preliminary to a repetition of said operations. Accordingly it will be observed that the vertical slide is raised twice and lowered twice during one complete reciprocable movement of the horizontal slide, which double lift movement is effected by a twin cam 28 operating in constant engagement with a hardened tool-steel insert 29 within an oval opening 30 in vertical slide 6. The reciprocable movement of horizontal slide 10 is effected by a crank arm 31 having a roller 31' thereon which operates in a straight slot 33 vertically in horizontal slide 10. Crank arm 31 is fixed to or forms an integral part of twin cam 28 which is keyed or otherwise fastened to a main drive shaft 32 mounted to rotate on roller bearings 34 within a bracket 35 and the upright part 3 on base 2. The main shaft may be driven by a belt and a pulley, or by an electric motor and suitable worm gearing, the latter form of drive being shown in the drawings.

The step by step feed movement of the saw is produced by a pawl consisting of a push member 36 secured adjustably within a holder 37 which is pivotally connected to the lower end of a spring controlled lever 38 mounted upon a stud bolt 39 extending forwardly from the upright part 3 of the main frame. A rocking lever 40 is also mounted upon stud bolt 39 under spring control and the free end of this lever extends in front of the vertical slide 6 which carries a projection 41 adapted to engage the said lever upon the upward movement of said slide. Rock lever 40 is provided with a finger 42 carrying an adjusting screw 43 which contacts with oscillatory lever 38, thereby transmitting the rocking movement of lever 40 to oscillatory lever 38 and thence to pawl 36, thereby feeding the saw forward a predetermined distance upon each movement upwardly of vertical slide 6. A lug on frame 3 supports another adjustable stop screw 43' which is engaged by rocking lever 40 to control the movement of the feed stroke, whereas adjustment of screw 43 on finger 42 controls the cut taken by the file on the face of the tooth.

The saw is fed forward between a pair of vise jaws 44—44' and rests upon a vertically movable bar 45 confined in a slot 46 in the vise body 47. An adjusting screw 48 is connected to bar 45, and this screw extends downwardly through the vise body and has a hand wheel 49 located in an exposed position beneath an angular support or bracket 50 affixed to or forming an integral part of main frame 2. A shaft 51 has rotatable bearing in the divided base part of vise body 47, and two cams 52 and 53, respectively, are mounted side by side upon the shaft. Cam 52 is used to shift one of the vise jaws, namely jaw 44', which is arranged to slide horizontally upon the top of vise body 47 to grip and hold the saw rigidly during filing and setting operations. At that time a very tight clamping effect is desired, but when the saw is to be fed forward the positive pressure on the saw is relieved and a yielding clamping pressure applied. This result is obtained by a lever 54 pivotally mounted at one side of the vise block or body 47, the upper end of said lever having a roller 55 engaged with the sliding jaw 44' and the lower end of the lever having a thumb screw 56 bearing against the free end of a secondary part 57 which is pivotally connected to lever 54 and carries a roller 58 held in constant engagement with cam 52 by a compression spring 59 interposed between part 57 and the lever at adjusting screw 56. Cam 52 is circular and has a depression 58 in a segmental portion thereof into which the roller 58 on part 57 is pressed by a spring when shaft 51 is oscillated in one direction, whereupon the compression spring 59 alone controls the working movement of lever 54 as part 57 is now separated from the contact end of screw 56. Under this condition slidable jaw 44 is held against the saw only by the pressure of spring 59, and the saw may be fed step by step as described, but before filing or setting operations begin shaft 51 is rotated and the saw is gripped and held under a positive pressure the degree of which is determined by the setting of screw 56, and which screw also permits working settings to be made for saws of different thicknesses. The degree of oscillatory movement imparted to shaft 51 is also subject to change and adjustment. The means for oscillating the shaft comprises an eccentric 60 on main drive shaft 32, an eccentric strap 61, and a connecting rod 62 having an adjustable sleeve 62' which is pivotally connected to a wrist pin 63 on a slide secured adjustably in a slotted arm 64 on oscillatory shaft 51. An adjusting screw 65 extends through the end of arm 64 and connects with the slide to permit the setting of pin 63 various distances from the center of the shaft, thereby changing the degree of arc movement of the arm and the oscillatory movement of shaft 51.

The second cam 53 on oscillatory shaft 51 operates a pair of saw setting devices, located on opposite sides of the vise block and consisting of a duplicate set of levers 66—66' mounted upon rock shaft 67—67'. The upper end of each lever carries a setting point or pawl 69 which is pressed downwardly by a flat spring 70 and caused to ride upon the top of the vise jaws. The setter points or pawls are arranged to move in opposite directions simultaneously and are offset in respect to one another to engage two consecutive teeth on the saw. Lever 66 is secured to rock shaft 67 by a thumb screw 68 and it can be shifted longitudinally on the shaft to place the setters varying distances apart to correspond with the spacing, length or position of the teeth on any given saw. The lower ends of levers 66—66' carry contact screws 70—70' which bear against the lower free ends of two pendant parts or tails 71—71' interposed between the contact screws 70—70' and cam 53. The tail members 71—71' carry separate rollers 72—72' which engage corresponding eccentric surfaces 73—73' on cam 53 so that both levers and the saw setting pawls thereon may be positively actuated in unison. Thus both setter points come into action at the same time, one setting a tooth to one side of the plane of the saw and the other setting the next tooth in an opposite direction or to the opposite side. Equal pressure is thereby applied to opposite sides of the saw simultaneously and the inherent spring in the saw neutralized and rocking or buckling of the saw in the vise jaws prevented. The amount of set given to each tooth may be readily changed by adjusting the screw 65 in arm 64 so as to change the degree of arc movement given to said arm and the corresponding rock movement given to the setter cam 53. Consequently both setters are controlled by the turn of the single screw 65. The setters are freed from the teeth when the levers carrying the setting points are rocked reversely on their pivots, and the reverse movement is effected by a spring 74 which extends through an opening in the vise body and is connected at its opposite ends to the two levers 66—66'. In operation the two saw teeth are set in opposite directions simultaneously while the saw is clamped tightly between the vise jaws. The set of the two teeth being in opposite directions the machine is so constructed that the file will engage the two set teeth successively, the one on the forward stroke and the other on the return stroke, the movement of the file always being in the direction of the set, thereby giving all the teeth keenly balancing cutting edges and a true set on both sides. If a burr is created by heavy filing it is in balance and the saw will cut straight, and a top burr is thrown over on the back of the teeth and not against the face. The oblique upward movement given to the file allows any amount of hook to be given to the teeth, and the file leaves the tooth gradually and gently by reason of the oblique or slanting lift movement of the file.

What I claim is:

1. In a saw making machine, a horizontally movable slide having means adapted to hold a double end file, supporting means for said slide adapted to move in a vertically inclined plane, a power shaft having a twin cam to operate said supporting means, said shaft including means for reciprocating said slide once during two consecutive operations of said supporting means, a vise having a movable jaw for holding a jaw in the path of travel of said double end file, an oscillatory shaft having means for activating said movable vise jaw and operating means for said oscillatory shaft coupled with said main shaft and actuated by rotation thereof, said operating means including a connecting rod coupled with said driving means, a crank lever attached to said oscillatory shaft and coupling means between said connecting rod and crank lever, said coupling means being longitudinally shiftably supported upon said crank lever to permit change in leverage of said lever.

2. In a saw making machine a double end file, reciprocable means supporting said file, driving means for said reciprocable means, means to lower and raise said file in an inclined straight plane during its forward and return stroke, means for rigidly clamping the saw during filing operations, oscillatory means including a crank lever coupled with said driving means for actuating said clamping means on the forward and return stroke of said reciprocable means, including means for changing the leverage of said crank lever for increasing and decreasing the oscillations of said oscillatory means.

3. In a saw making machine, a double end file, reciprocable means supporting said file, rotatable driving means coupled with said reciprocating means, reciprocatory means to raise and lower said file during its forward and return stroke, means for clamping the saw during filing operations, oscillatory means including a crank lever for actuating said clamping means, and a coupling connection between said driving means and the crank lever said oscillatory means to transform the rotary movement of said driving means into an oscillatory movement of said oscillatory means, including shiftable means to change the leverage of said crank lever to decrease and increase the oscillatory movement of said oscillatory means.

4. A saw making machine according to claim 2, whereby the oscillatory means include a cam member with symmetrically arranged cam surfaces, a rotatable shaft supporting said cam member and said crank lever, and whereby the means for decreasing and increasing the oscillations of said oscillatory means consist of a member longitudinally adjustably secured to said crank lever.

In testimony whereof I affix my signature.

FRANK W. WARDWELL.